Figure 1:
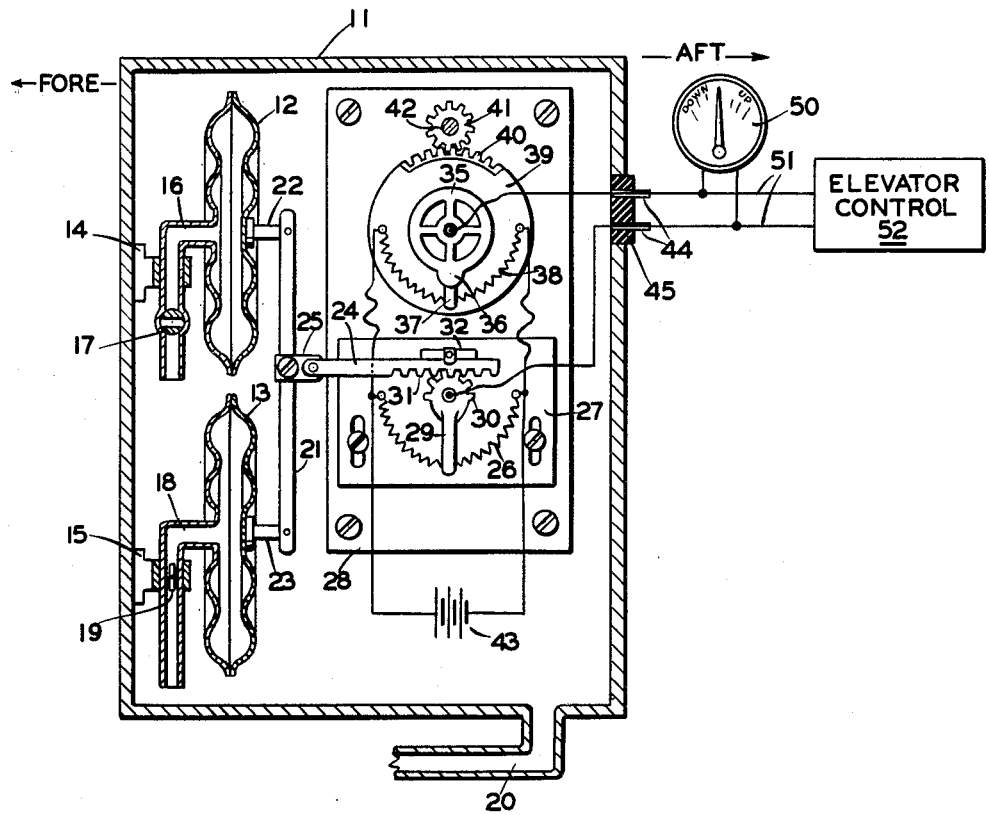

Jan. 3, 1956    F. W. SCHULE    2,729,804

AIRCRAFT ALTITUDE SIGNAL GENERATOR

Filed Nov. 19, 1953

INVENTOR
FREDERICK W. SCHULE

BY Geo. J. Hyde
ATTORNEY

United States Patent Office 2,729,804
Patented Jan. 3, 1956

2,729,804

AIRCRAFT ALTITUDE SIGNAL GENERATOR

Frederick W. Schule, Shorewood, Wis., assignor to Bendix Aviation Corporation, Teterboro, N. J., a corporation of Delaware Application November 19, 1953, Serial No. 393,075

6 Claims. (Cl. 340—27)

This invention relates to aircraft control systems, and is particularly directed to an improved arrangement for providing an operating signal for automatic altitude control.

The operation of certain automatic altitude control systems is based on the use of a gyro, arranged to maintain the longitudinal axis of the plane at a fixed angle to the gyro axis, and to operate the elevator to correct any pitch tilt downward or upward from that position. This method has several drawbacks. The angle required to keep the aircraft on a level course varies with speed and load. Air currents may carry the aircraft up or down without changing the angle of the plane to the horizontal; and accidents, such as strain or damage to the plane structure in the neighborhood of the gyro, may change the angle of the gyro axis and render the system ineffective. Moreover, the gyro-controlled system is quite expensive, especially for small aircraft.

A purpose of the invention is to provide an arrangement that will largely or entirely overcome these difficulties, and in particular one which does not require the use of a gyro. The improved system utilizes an element sensitive to air pressure, preferably of the aneroid barometer type, which responds directly to changes in altitude, and a second element that is sensitive to the rate of change in altitude. The responses of these two elements are combined to provide an altitude factor signal, since the proper adjustment of the elevator of an aircraft to correct a deviation from the chosen altitude is affected by both the extent and the rate of deviation from said attitude.

However, there is another important factor that affects the change in altitude, namely, the pitch of the aircraft, that is, the angle of the longitudinal axis of the aircraft to the horizontal; and an arrangement is provided for producing, in addition to the altitude factor signal, a pitch factor signal corresponding to deviations from the correct pitch angle for level flight. In quiet air under normal conditions there is of course a direct relationship between the two factors; for instance, a downward pitch angle deviation will produce a corresponding loss in altitude at a proportionate rate. But where the air has an appreciable upward or downward flow, the relationship changes. For instance, in an updraft the pitch angle must be deflected downward for level flight, while the altitude and rate of climb factor remains constant; on the other hand, the pitch angle may remain the same while the aircraft is carried bodily down or up by the air. Under such conditions systems that depend on either factor alone are subject to error.

A general object of the invention is to provide a signal generating arrangement, adapted for use with established automatic altitude control systems for aircraft, which will produce a signal representative of changes in pitch, altitude, and rate of vertical travel, properly correlated to produce the elevator adjustment required for optimum correction of the deviation from horizontal flight at the selected altitude.

This is in general accomplished by providing a voltage corresponding to the pitch and a second voltage corresponding to the combined altitude and rate of altitude change, and balancing these voltages to produce a null when the plane is in level flight at the selected altitude. When the plane deviates upwardly or downwardly, these voltages are changed accordingly to produce a corresponding signal voltage suitable for operation of an automatic elevator adjusting system of standard type.

The signal balancing is effectively and simply accomplished by employing a bridge circuit having one arm variable in accordance with changes in the pitch angle, and another arm variable in accordance with changes in altitude and rate of vertical travel. The circuit is arranged so that when both factors indicate deviation in the same direction, their voltage changes are added, but if the factors are opposed, as when an updraft carries the aircraft up in spite of downward deviation in pitch, their voltage changes are subtracted, so that, in the latter case for instance, the downward pitch angle is not excessively increased.

An object of the invention is therefore to provide an aircraft altitude control signal generator comprising pitch responsive means, altitude change responsive means, and means for establishing an electrical output proportional to the responses of both of said responsive means. Another object is to provide an output of this type whose ampltitude is proportional to the sum of the responses, and whose polarity corresponds to the direction of the altitude change. A further object is to produce a signal generator of the indicated type which is relatively simple, employs standard elements and does not require the use of a gyro.

More specific objects include the improvement of parts of the general system, including novel features in the pitch signal unit and in the combined altitude and vertical travel rate change signal generating means, and particularly the provision of an arrangement for adjusting the proportions of these two latter factors to adapt the instrument to different types of aircraft and varying conditions of flight.

The foregoing and other objects and advantages of the invention will appear more fully hereinafter from a consideration of the detailed description which follows, taken in conjunction with the accompanying drawing, wherein two embodiments of the invention are illustrated. It is to be expressly understood, however, that the drawing is for purposes of illustration and description, and is not to be construed as defining the limits of the invention.

Figure 2:
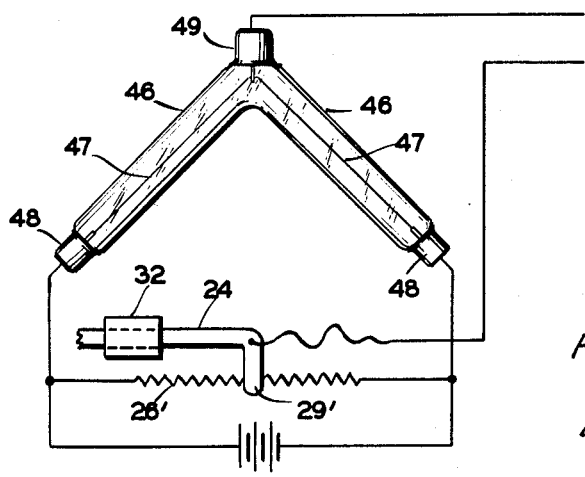

Referring now to the drawing for a more detailed description of the novel control system embodying the present invention:

Fig. 1 is a side elevation in vertical central section, partly diagrammatical, of a signal generator; and Fig. 2 is a diagram of a modified form of a portion thereof.

The illustrated unit is enclosed in a casing 11 on which hollow diaphragms 12 and 13 are mounted in alignment by brackets 14 and 15. Diaphragm 12, used to indicate altitude, is connected with the interior of casing 11 through duct 16, which may be closed by valve 17. The interior of diaphragm 13, used to indicate the rate of vertical travel, communicates with said casing interior through duct 18, restricted by a filler block 19 so that only a very small passage for air is left. Case 11 is closed except for an outlet through the static tube 20, which maintains the interior of the casing at the same pressure as the atmosphere surrounding the aircraft.

With this arrangement, when valve 17 is closed the expansion and contraction of diaphragm 12 will indicate changes in air pressure and therefore changes in altitude from the pressure in casing 11 when valve 17 is first closed, which identifies the selected flight altitude. As the air in diaphragm 13 will travel very slowly past block 19, the expansion or contraction of this diaphragm in accordance with changes in air pressure in casing 11 will in well-known manner reflect the rate of pressure change and therefore the rate of change in altitude.

Diaphragms 12 and 13 are linked together so as to obtain a resultant of their positions. In the form shown, a bar 21 extending parallel to the diaphragms is pivotally connected to the centers of said diaphragms 12 and 13 by posts 22, 23. A suitable signal generator element is connected to bar 21; and transverse movements of the bar will impart to said element motion proportional to the relative movements of diaphragms 12 and 13. The proportional relationship of these movements can be varied by connecting said element at different points along bar 21. This is of importance in obtaining a proper signal for operating the elevator to correct deviation from the selected altitude, since both the amount of deviation and the rate of deviation must be taken into consideration; and the proper proportions of these two factors required to produce the correct elevator shift differs with different types of aircraft.

In the embodiment illustrated, altitude signal rod 24 is pivotally connected to clamp 25 adjustably engaging bar 21, and produces an electrical signal by moving a contact along a potentiometer 26, mounted on a block 27 adjustably conected to base 28 on casing 11, so that block 27 may be moved in accordance with shifts in the position of clamp 25 on bar 21. In the form illustrated in Fig. 1, the rotating contact arm 29 of potentiometer 26 carries a gear sector 30 meshing with rack 31 on rod 24 and held in place by guide block 32, so that transverse movements of rod 24 are reproduced by the voltage on arm 29. However, as shown in Fig. 2, rod 24 may simply be provided with a contact arm 29' arranged to slide along a straight line potentiometer 26'.

An arrangement is provided for producing a signal proportionate to changes in pitch of the aircraft, and advantageously includes a sliding contact operated by a pendulous element. In the form illustrated in Fig. 1, an element is provided which will not be materially affected by transitory changes in pitch. The illustrated construction employs an inertia wheel 35 pivotally mounted on base 28 and provided with a pendulous projection 36 of adequate weight connected to and aligned with a contact arm 37 slidably engaging a potentiometer resistance 38 concentric with wheel 35 and mounted on an insulating disk 39 pivoted about the same center. A rack segment 40 on the margin of disk 39 is engaged by pinion 41 carried by shaft 42 journaled in base 28.

A source of electrical energy, illustrated as battery 43, is connected across the ends of potentiometer resistances 26 and 38. Contact arm 29 and inertia wheel 35, which is electrically connected to contact arm 37, are connected to the prongs 44 of outlet plug 45 in the side of casing 11. It will be noted that the described electrical arrangement constitutes a bridge, the relative resistance of whose arms is determined by the relative positions of contact arms 24 and 37.

Other instrumentalities for developing a signal proportional to the pitch of the aircraft may be employed. One alternative form is illustrated in Fig. 2, and comprises a pair of straight tubes 46 arranged at an angle to each other, connected at their adjacent ends and sealed to form a V-shaped chamber filled with an inert gas such as argon. A pair of very fine nickel wires 47, whose resistance varies materially with changes in temperature, are mounted axially in tubes 46, being connected at their outer ends to metal caps 48 and at their inner ends to metal cap 49. A current is passed through wires 47 sufficient to heat the wires and the gas, which will flow upwardly by convection around wires 47, cooling the filaments and thereby varying their resistance. The rate of flow and consequently the amount of cooling will depend upon the angle of each tube 46 relative to the horizontal. Consequently, when the unit is tilted to raise one tube and lower the other, the resistances of the two wires 47 will change in proportion to the angle of tilt. A unit of this type is manufactured by Bendix Aviation Corporation of Teterboro, New Jersey, under their registered trademark "Convectron."

In operation, casing 11 is mounted so that the inertia wheel 35 or the convection tubes 46 extend in a fore and aft direction. Clamp 25 is positioned to produce the correct ratio of rate signal to altitude signal for efficient operation of the elevator control of the aircraft in which the unit is located. When the aircraft has reached the desired altitude, valve 17 is closed, and potentiometer disk 39 is rotated until the bridge balances, a condition which may be readily determined by connecting across the leads 51 from prongs 44 a voltmeter type indicator 50 having a central zero position. This adjustment is necessary because the correct pitch of the aircraft for level flight will vary with conditions and particularly with changes in loading and speed.

With the system set for level flight at a selected altitude, if the aircraft should descend due to improper elevator position, the pitch contact arm 37 will slide over the resistance 38 in one direction, for instance to the left in Fig. 1, unbalancing the bridge and placing a voltage across leads 51 proportional to the change in pitch. The voltage by itself constitutes a pitch signal, and can of course be utilized alone for indicated or control purposes. At the same time diaphragm 12 will contract in proportion to the decrease in altitude, while diaphragm 13 will contract more slowly in accordance with the rate of decrease. Posts 22 and 23 will therefore move to the left at different rates and their movements will be reflected by movement of altitude rod 24, the proportions of the two post movements which produce the latter rod movement being determined by the point of engagement of clamp 25 with bar 21. This point will, however, be fixed to a given plane and control system. Altitude rod 24 will of course be shifted to the left, which will swing contact arm 29 to the right, changing the voltage on the latter arm and producing a signal proportional to the combination of the altitude change and the rate of altitude change. However, the contact arms 29 and 37 constitute the output corners of the bridge, so that the bridge output will be the total voltage difference between these arms. Where the two arms move in opposite directions, as under the conditions just described, the voltages, which constitute separate signal elements as indicated, will be added to form the resultant output signal.

This signal will be shown on the voltmeter indicator 50 by a commensurate movement of the needle to the left, indicating downward deflection. Where the output leads 51 are also connected to an automatic elevator control system 52, the leads will be actuated to raise the elevator to an extent indicated by said output and thereby bring the aircraft back to the selected flight altitude. A control system suitable for this purpose is disclosed in Patent No. 2,625,328, Noxon, January 13, 1953. The same result will be attained with the convection tube shown in Fig. 2, the tubes 46 being located in a longitudinal vertical plane.

If the aircraft should deviate upwardly from the selected flight altitude, the action of the system will be similar but the contact arms 29 and 37 will of course travel in opposite directions. This will result in a reversal of polarity in output leads 51, and voltmeter 50 will shift in the opposite direction. It will also be apparent that if alternating current instead of direct current from battery 43 is applied across the bridge, the phase of the output will indicate whether the deviation is upward or downward.

Although only one embodiment of the invention has been illustrated and described in detail, together with alternative forms of those of its components, it is to be expressly understood that the invention is not limited thereto. Various changes can be made in the design and arrangement of the parts without departing from the spirit and scope of the invention as the same will now be understood by those skilled in the art. For instance, while a bar 21 is shown as the method of obtaining the desired resultant of the movements of diaphragms 12 and 13, suitable gearing or other known elements for obtaining said resultant may be employed. Other methods of transmitting movement, such as synchros, can also be substituted in known manner.

I claim:

1. An aircraft altitude control signal generator comprising means for producing a first electrical signal having a polarity corresponding to the direction of pitch deviation from level flight pitch and an amplitude corresponding to the extent of such deviation, means for producing a second electrical signal having a polarity corresponding to the direction of a change in altitude and an amplitude corresponding to the rate and amount of such change, the polarity of such signals being opposite for changes in the same direction, and means for combining said signals to produce a resultant control signal.

2. An aircraft altitude control signal generator comprising an element responsive to barometric pressure, an element responsive to the rate of change in barometric pressure, means for producing a first electrical signal proportional to a resultant of the responses of said elements, an element responsive to pitch variations, means for producing a second electrical signal corresponding to the response of the latter element, and means for combining said signals to produce an altitude control signal.

3. An aircraft altitude control signal generator comprising an element responsive to barometric pressure, an element responsive to the rate of change in barometric pressure, means for producing a first electrical signal proportional to a resultant of the responses of said elements, an element responsive to pitch variations, means for producing a second electrical signal corresponding to the response of the latter element, and means for combining said signals to produce an altitude control signal, comprising a bridge including two resistances connected in parallel across a source of electrical energy, a movable contact engaging each resistance, means for positioning one contact in accordance with pitch, means for positioning the other contact in accordance with changes in aircraft altitude, and an output circuit connected across said contacts.

4. An aircraft altitude signal generator comprising a bridge circuit including two resistors connected at their ends across a source of electrical energy, a sliding contact on each resistor constituting a bridge output, means for shifting one contact in one direction along the associated resistor in accordance with a change in pitch, and means for moving the other contact in the opposite direction in accordance with a change in the aircraft's altitude in the same direction as the pitch change, said latter means including a device responsive to the extent of altitude change, a device responsive to the rate of altitude change, and means for shifting the latter slide contact in proportion to a resultant of the responses of said two devices.

5. An aircraft altitude control signal generator comprising a first element responsive to altitude changes, having a member shifted in accordance with such changes; a second element responsive to the rate of altitude changes, having a member shifted in accordance with the latter changes; an actuating arm connected transversely to and shifted by said members at spaced points; means engaging said arm at an intermediate point and actuated by movements of the arm at the latter point to produce a first electrical signal proportional to such movements; means for producing a second signal proportional to changes in aircraft pitch from level flight pitch; and means for combining said signals to provide an altitude control signal.

6. A signal generator as claimed in claim 5, in which the arm-engaging means is arranged for engagement at different points on the arm, whereby the effective ratio of altitude changes to altitude rate changes in the first signal may be varied.

References Cited in the file of this patent

UNITED STATES PATENTS

| | | |
|---|---|---|
| 2,044,009 | McNally | June 16, 1936 |
| 2,214,181 | Rylsky | Sept. 10, 1940 |
| 2,637,911 | Ludwig | May 12, 1953 |
| 2,659,041 | Kutzler | Nov. 10, 1953 |
| 2,663,008 | McEwan | Dec. 15, 1953 |